P. E. PERMAN.
SELF CALCULATING BALANCE.
APPLICATION FILED JAN. 16, 1915. RENEWED APR. 5, 1919.
1,321,845.
Patented Nov. 18, 1919.
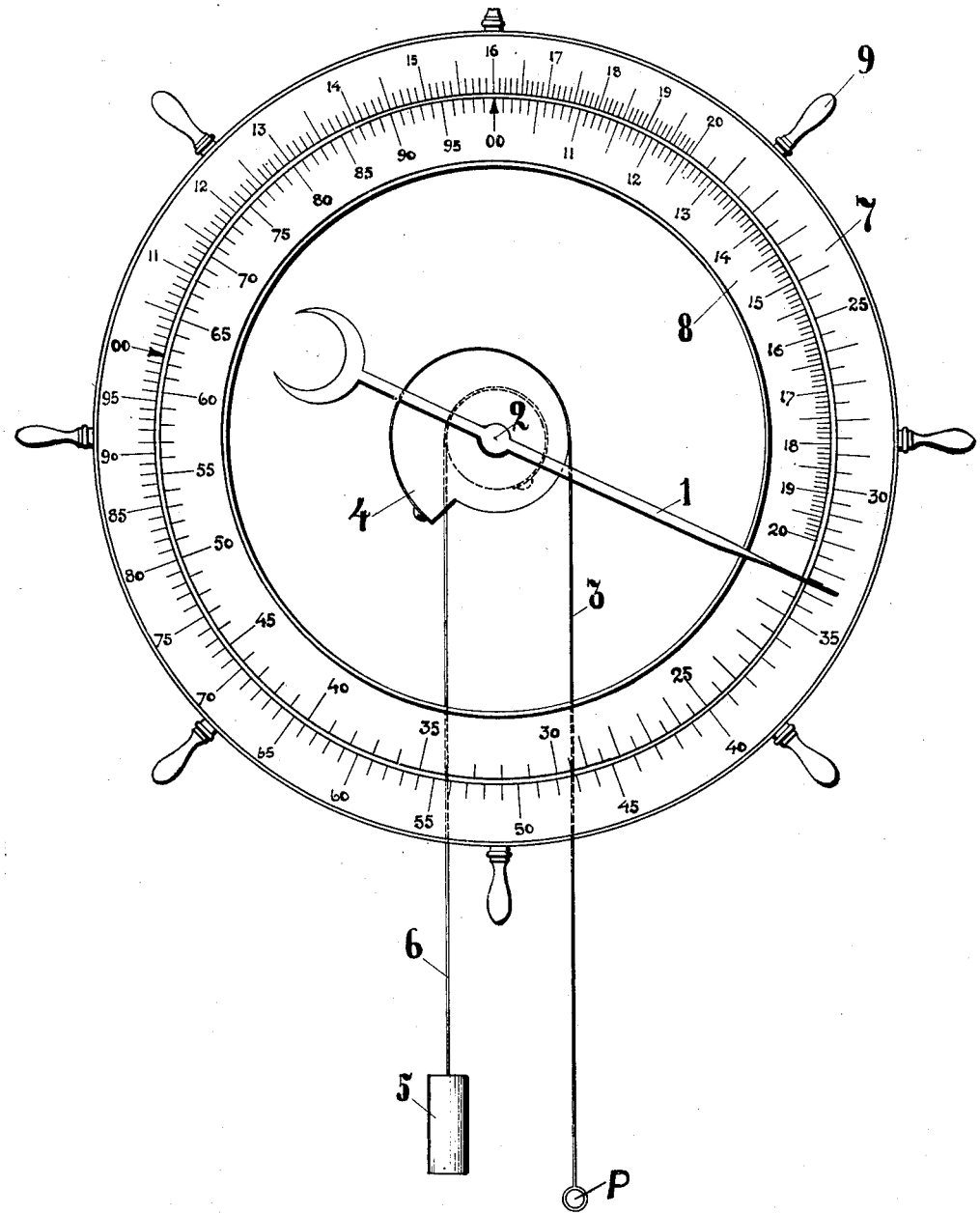
Witnesses:—
E. Daniels
Joseph W. Harris
Inventor
Per Emil Perman
by Byrnes, Townsend & Bickenstein,
Attys.

UNITED STATES PATENT OFFICE.

PER EMIL PERMAN, OF STOCKHOLM, SWEDEN, ASSIGNOR OF ONE-HALF TO HUGO TEODOR TILLQUIST, OF STOCKHOLM, SWEDEN.

SELF-CALCULATING BALANCE.

1,321,845.  Specification of Letters Patent.  Patented Nov. 18, 1919.

Application filed January 16, 1915, Serial No. 2,603. Renewed April 5, 1919. Serial No. 287,928.

*To all whom it may concern:*

Be it known that I, PER EMIL PERMAN, a subject of the King of Sweden, and resident of Sturegatan 50, Stockholm, Sweden, have invented certain new and useful Improvements in Self-Calculating Balances, of which the following is a specification.

The idea on which the present invention is founded can most suitably be applied on a spring or a pendulum balance or on any balance with a movable organ, whose position states the weight. The object of the invention is to construct an apparatus with which the price of the weighed article on the basis of a certain price per unit can be read off. It is therefore obvious that the balance must be provided with a multiplier. Such an apparatus which can be modified in view of the said purpose exists already in the so-called calculating stick, which is founded on the known proposition that $\log a + \log b = \log ab$.

A practical constructional form of the invention is illustrated partly diagrammatically on the accompanying drawing.

P is the pivotal point of a link of a balance (not otherwise illustrated) and has different positions for different weights placed on the balance. The movement of this link-point is transferred to the pointer 1 in such a manner that the turning angle of the pointer on the axis 2 in every case constitutes a graphical measure of the logarithm of the number, which in a certain unit of weight states the value of the weight on the balance.

This can for instance be carried out in the manner shown wherein a very thin spring, cord or the like 3 from the link-point P is wound upon a helical plate 4 whose outline is calculated in such a manner, that the angle of the unwinding corresponds to the logarithm of the number which states the value of the weight. A counter-weight 5 with its cord 6 operates to restore the parts. This detail can be constructed in many other ways.

The multiplier comprises further a rotatable ring 7 provided with a logarithmical graduation, corresponding to the said movement of the pointer, but with the numbers corresponding to the logarithms.

It is further suitable but not necessary to have a fixed scale 8 with the same logarithmical angle graduation as the movable ring 7 and also with the numbers corresponding to the logarithms. The movable scale 7 may be mounted with its inner edge around the fixed scale 8, the rotation of the ring 7 being facilitated by handles 9.

The balance is used in the following manner:

When the article to be weighed costs for instance $1.60 per kilogram, the ring-like scale 7 is set with aid of the handles 9 so that the number 160 on the scale corresponds with the zero position of the pointer. When the article is placed on the balance, the pointer 1 is deflected and the exact weight (on the drawing 2.2 kg.) can then directly be read from the fixed scale 8. At the same time the pointer also indicates the cost $3.52 on the movable scale 7. If the scale 7 were turned back to the zero position it would indicate the weight so that the fixed scale is not necessary but is very convenient. The size of the scales makes it possible for graduation in cents; and when the graduation is made helical instead of circular, through deviation angles greater than 360° is possible.

While I have described my invention as especially applicable for the computing of values in connection with balances, it is to be understood that it is generally applicable for indicating values where the value depends upon the product of a quantity measurable in units or standards and the price per unit.

I claim:—

1. In a computing-scale for measuring instruments, a pointer, a scale over which said pointer is adapted to move, means for moving said scale, means adapted for connection to a measuring instrument for moving the pointer through an angular distance corresponding to the logarithm of the quantity measured, and a fixed zero-position indicator, said movable scale being graduated in units such that when any graduation mark representing a unit of price registers with zero said pointer will indicate on the scale the product of the quantity and the unit of price.

2. In a computing-scale for measuring instruments, a pointer, a scale over which said pointer is adapted to move, means for moving said scale, a fixed scale concentric with and adjacent to the movable scale and coöperating with said pointer to indicate quantity, means adapted for connection to a balance for moving the pointer through an angular distance corresponding to the logarithm of the quantity measured, and a fixed zero-position indicator, said movable scale being graduated in units such that when any graduation mark representing a unit of price registers with zero said pointer will indicate on the scale the product of the quantity and the unit of price.

3. In a computing-scale for measuring instruments, a pivoted pointer, a scale over which said pointer is adapted to move, means for moving said scale, a rotatable helical logarithmic plate upon which said pointer is carried, means connecting the measuring instrument and said plate to move the latter and therefore the pointer through an angular distance corresponding to the logarithm of the quantity measured, and a fixed zero-position indicator, said movable scale being graduated in units such that when any graduation mark representing a unit of price registers with zero said pointer will indicate on the scale the product of the quantity and the unit of price.

In testimony whereof I have signed my name to this specification in the presence of two subscribing witnesses.

PER EMIL PERMAN.

Witnesses:
JOHN MARKMAN,
HILDNE THORLING.